UNITED STATES PATENT OFFICE.

GEORGE W. HOUSEHOLDER, OF KANSAS CITY, MISSOURI.

IMPROVEMENT IN COMPOUNDS FOR THE MANUFACTURE OF ARTIFICIAL MARBLE AND STONE.

Specification forming part of Letters Patent No. 172,567, dated January 25, 1876; application filed October 16, 1875.

*To all whom it may concern:*

Be it known that I, GEO. W. HOUSEHOLDER, of Kansas City, Missouri, have invented a Compound for the Manufacture of Marble and Stone, of which the following is a specification:

This invention relates to a composition for the manufacture of marble or stone from its chemical compounds; and consists of a cement prepared from pulverized gypsum and calcite, sulphuric acid, sulphate of alumina, and sulphate of iron combined with the oxides of zinc and lead, the acetates of zinc, lead, and alumina, the silicate of potash, borax, and the bisulphate of alumina in solution.

The ingredients from which said cement is made are used in about the following proportions, viz: I take from seventy-five to one hundred pounds of pulverized gypsum, and about one-half said amount of pulverized calcite, with which I thoroughly mix from three to five pounds of sulphate of alumina and sulphate of iron, equal parts, and from one to three quarts of sulphuric acid, the whole dissolved in a sufficient quantity of water to completely saturate it, and to produce an effervescence of the whole mass, which, when sufficiently dried, is placed in a kiln prepared for the purpose, where it is submitted to a sufficient amount of heat to produce calcination, and when cool is reduced to powder by grinding through a mill, and bolted through a fine sieve or bolting-cloth.

To the above-described mass I add the following chemicals, in solution, in order to form my compound, with which I produce my marble or stone, namely: I dissolve from six to ten ounces of the bisulphate of alumina, from one to two ounces of each the oxides of zinc and lead, from three to four ounces of each of the acetates of alumina, zinc, and lead, about one quart of the silicate of potash, and about half a pound of borax, the whole dissolved in soft water in sufficient quantity to thoroughly saturate said cement, and reduce it to the consistency of a thick paste, which I place into molds or patterns prepared for the purpose, having first applied a thin solution of shellac, to prevent the compound from adhering to the molds. It is then pressed firmly with the hands, tamping, or by suitable machinery. The chemical action produced by the union of these ingredients will in a few hours harden the compound sufficiently that it can be removed from the molds with safety. These molds or patterns can be made out of wood, cast-iron, tin, zinc, gelatine, and plaster-of-paris, and into any shape or architectural design intended.

As soon as sufficient hardness is obtained to permit handling without breaking, the marble or stone thus produced is rubbed to a smooth surface by means of pumice-stone and water, and when dried out I close up all cavities that appear on the surface, with the same material used in the manufacture, by means of a thin blade of polished steel.

After a few hours drying the marble or stone is laid upon tables prepared for the purpose, for final rubbing, which is done with a fine-grained hone or stone, until a perfectly smooth and hard surface is obtained. It is then placed on racks through which the air can pass, to dry out thoroughly, which requires usually two or three days, and is then ready to receive the polish, which is done as follows: I dissolve a small quantity of clear glue, some borax, and stearic acid in hot water, in which I dip a bunch of excelsior or other soft material, having first sprinkled over the surface a small quantity of cement or plaster-of-paris, and quickly rub it over and off, thus drying and hardening the surface, and closing up all defects, and leaving it in a condition to receive a beautiful and durable polish, which is done by the same process and by the use of the same means as practiced in polishing up natural marble or stone.

In order to produce the different varieties of marble or stone I introduce into my compound, at the time of its admixture, such permanent mineral or vegetable pigments as I desire, in order to produce the marble or stone intended, and it is done by manipulating the same according to taste, or in imitation of natural marble.

By the process of molding, I manufacture out of my compound marble or stone into almost every conceivable variety of architectural design, and for every purpose to which natural marble is adapted and used.

Having fully described my compound and its method of preparation, what I claim, and desire to secure by Letters Patent, is—

The composition, consisting of a cement prepared from pulverized gypsum and calcite, sulphuric acid, sulphate of alumina, and sulphate of iron combined with the oxides of zinc and lead, the acetates of zinc, lead, and alumina, the silicate of potash, borax, and the bisulphate of alumina in solution, and the mode of preparation and admixture, substantially as described.

GEORGE W. HOUSEHOLDER.

Witnesses:
  THOS. H. SMITH,
  JNO. P. SWYGARD.